United States Patent [19]
Lowther

[11] 4,101,296
[45] * Jul. 18, 1978

[54] OZONE DECOMPOSITION AND ELECTRODESORPTION PROCESS

[75] Inventor: Frank Eugene Lowther, Severna Park, Md.

[73] Assignee: W. R. Grace & Co., New York, N.Y.

[*] Notice: The portion of the term of this patent subsequent to Jul. 26, 1994, has been disclaimed.

[21] Appl. No.: 789,307

[22] Filed: Apr. 20, 1977

Related U.S. Application Data

[63] Continuation of Ser. No. 568,933, Apr. 17, 1975, abandoned, and a continuation-in-part of Ser. No. 694,017, Jun. 7, 1976, Pat. No. 4,038,050, and a continuation-in-part of Ser. No. 768,763, Feb. 15, 1977, which is a continuation-in-part of Ser. No. 625,237, Oct. 23, 1975, abandoned, which is a continuation-in-part of Ser. No. 527,832, Nov. 27, 1974, abandoned.

[51] Int. Cl.² .............................................. B01D 53/04
[52] U.S. Cl. ............................................. 55/33; 55/75; 204/130; 423/219
[58] Field of Search ...................... 210/63 Z; 250/533; 423/210, 219; 204/129, 130, 176, 186 B, 19 SN, 26 S, 144 S; 55/75, 208, 389, 29, 31, 32–35, 62

[56] References Cited

U.S. PATENT DOCUMENTS

| | | | |
|---|---|---|---|
| 3,006,153 | 10/1961 | Cook | 55/389 |
| 3,188,283 | 6/1965 | Cole | 204/195 |
| 3,433,580 | 3/1969 | Deuringer | 423/210 |
| 3,516,783 | 6/1970 | Blanchard | 423/210 |
| 3,663,418 | 5/1972 | Kawahata | 250/533 |
| 3,734,293 | 5/1973 | Biskis | 55/208 |
| 3,748,262 | 7/1973 | Lee et al. | 210/63 Z |
| 4,038,050 | 7/1977 | Lowther | 55/18 |

*Primary Examiner*—Thomas G. Wyse
*Attorney, Agent, or Firm*—Arthur P. Savage

[57] ABSTRACT

An ozone decomposition system wherein moist ozone-containing gas is contacted with a bed of active zeolite molecular sieve particles for converting ozone, which comprises means for reactivating the bed by directly applying to the zeolite particles a high-voltage low-frequency electrical field having sufficient potential gradient to separate sorbed moisture as molecular water.

12 Claims, 1 Drawing Figure

U.S. Patent    July 18, 1978    4,101,296
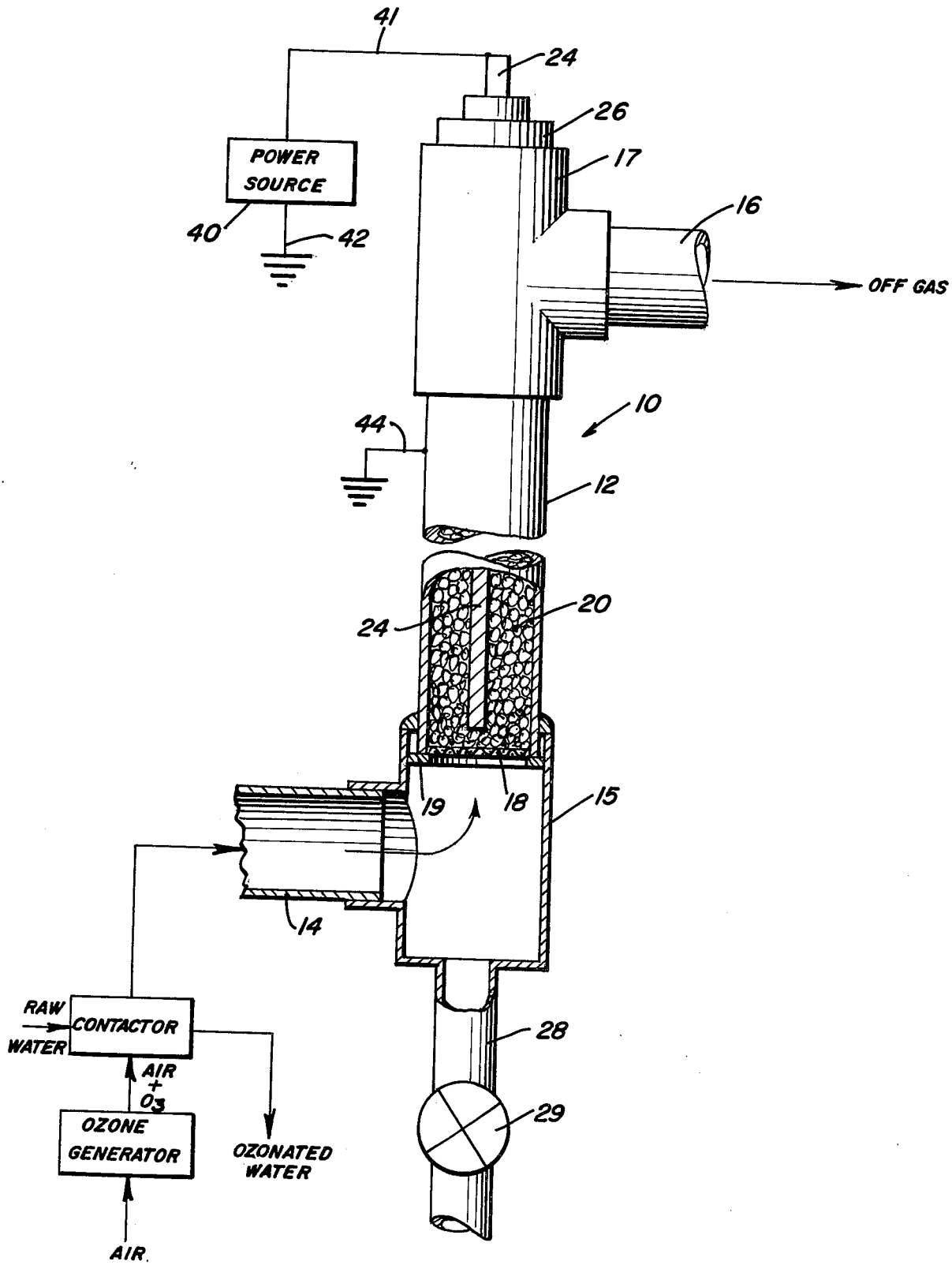

OZONE DECOMPOSITION AND ELECTRODESORPTION PROCESS

This application is a continuation of Ser. No. 568,933, filed Apr. 17, 1975, now abandoned; and a continuation-in-part of Ser. No. 694,017, filed Jun. 7, 1976, now U.S. Pat. No. 4,038,050; and a continuation-in-part of Ser. No. 768,763, filed Feb. 15, 1977, which is a continuation-in-part of Ser. No. 625,237, filed Oct. 23, 1975, abandoned, which is a continuation-in-part of Ser. No. 527,832, filed Nov. 27, 1974, abandoned.

BACKGROUND OF THE INVENTION

This invention relates to methods for decomposing ozone. In particular it provides means for contacting an ozone-containing gas with a material which eliminates residual ozone, such as that amount present in offgas from contactor-type reactors.

Ozone is used commercially in a variety of oxidation processes, including disinfection of potable water, deodorization of air and waste gases, preservation of perishable goods, chemical synthesis and in the treatment of industrial or municipal wastes. Many of these processes involve contacting an ozone-containing gas with an aqueous reactant. Since ozone is often used in stoichiometric excess or reacts incompletely, residual ozone in a moist offgas is an effluent. Prolonged contact with ozone in a concentration of more than 1-10 ppm is considered unsafe, and venting the residual ozone directly in the off-gas to the atmosphere might prove hazardous. For this reason, a decomposer to kill the remaining ozone is employed in conjunction with most ozone treatment processes.

Ozone is known to decompose thermally in the range from about 80° C to 500° C. It is generally understood that ozone undergoes decomposition to diatomic oxygen ($O_2$) and nascent oxygen [O] in contact with another body. The nascent oxygen then reacts with another molecule of ozone ($O_3$) to yield another two molecules of oxygen ($O_2$).

The decomposition of ozone is catalyzed by many materials. For instance, solid beds of NaOH, $Ag_2O$, NiO, $MnO_2$ and natural or synthetic zeolites are known to accelerate ozone decomposition at various operating temperatures.

The preferred decomposition systems are those which are effective at ambient temperature, thereby avoiding the energy costs of heating the entire offgas stream to kill a minor amount of toxic ozone. While a number of solid catalytic materials are available, their high cost or short life make many catalysts uneconomical. Where the overall process involves ozone contacting a water-containing stream, as in the treatment of aqueous waste-streams, moisture taken up by the effluent gas stream can have a deleterious affect on the decomposition catalyst. This has been a particularly difficult problem where zeolite molecular sieve materials have been used for decomposing ozone. It is generally believed that ozone is adsorbed by the crystalline alkali metal aluminosilicates. According to U.S. Pat. Nos. 3,006,153 and 3,663,418, if the temperature is maintained below $-50°$ C, no substantial amount of decomposition takes place in the solid molecular sieve structure. However, at higher temperatures, oxygen is released in a rapid decomposition. Commercial availability and low cost makes zeolite structures attractive; however, when the stream-contained residual ozone also contains water, the strong affinity of the molecular sieve for its hydration state renders the bed practically non-reactive for ozone decomposition. This is probably due to occupation of adsorption sites by water. In the prior art, it was necessary to interrupt ozone flow through the decomposition reactor for long periods to permit regeneration of the molecular sieve by heating to relatively high temperatures (e.g., 200° C to 300° C). This required multiple beds for continuous service, with a spare reactor being switched into service while the moisture-laden zeolite was being reactivated.

SUMMARY OF THE INVENTION

It has been discovered that molecular sieve ozone decomposers may be regenerated quickly and economically by an electrodesorption technique to remove water.

Accordingly, it is an object of this invention to provide novel processes for ozonizing a stream of oxygen-containing gas, contacting the ozonized gas with an aqueous reactant, recovering moist offgas from the aqueous reactant, said offgas containing residual ozone, contacting the offgas with zeolite molecular sieve particles at a temperature greater than $-50°$ C to decompose ozone, and regenerating the molecular sieve by applying an electrodesorption potential to remove any sorbed moisture. In particular, the system provides for confining the molecular sieve particles containing sorbed water between electrodes, applying an electrodesorption potential of at least 0.2 Kv/cm and having a frequency of 0 to 1000 Hz between the electrodes, and separating desorbed water from the molecular sieve.

The electrodesorption process is adapted for regenerating a moist molecular sieve porous bed of synthetic crystalline metal alumino silicate material having an average particle size of about $1\mu$ to $1000\mu$, wherein the alumino silicate material consists essentially of at least one zeolite selected from the group consisting of Type A, Type L, Type X, Type Y and mixtures of these zeolites. The preferred zeolite particles have an average particle size of about $10\mu$ to $500\mu$, and may be dehydrated by a substantially constant regeneration current density through the bed of about 0.01 to $100\mu a/cm^2$.

One advantage of the system is the low amount of electrical energy consumed in regenerating the bed, which is slightly greater than the caloric equivalent to the heat of vaporizing the water removed from the bed.

The process employs low frequency electrical power, applied between the electrodes at a potential gradient of about 0.2 to 10 Kv/cm at a frequency from DC to about $10^3$Hz. Under certain circumstances the ozone generating means and bed regenerating means have common power supply means.

These and other objects and features of the invention will be apparent to one skilled in the art from the following description and in the drawing, wherein the single figure is a schematic representation of the system, including a vertical cross-section view of a typical decomposition reactor equipped with electrodesorption means.

DESCRIPTION

The molecular sieve materials consist essentially of crystalline, hydrated metal aluminosilicates with a number of unusual properties. The most important types of molecular sieves are made synthetically, but their structure is similar enough to certain naturally occurring minerals to be classified as zeolites. Although the crystal structures of some of the molecular sieves are quite different (two types, A and X, are most important), their significance as commercial adsorbents depends on the fact that in each the crystals contain interconnecting cavities of uniform size, separated by narrower openings, or pores, of equal uniformity. When formed, this crystalline network is full of water, but with moderate heating, the moisture can be driven from the cavities without changing the crystalline structure. This leaves the cavities with their combined surface area and pore volume available for adsorption of water or other materials. The process of evacuation and refilling the cavities may be repeated indefinitely, under favorable conditions.

With molecular sieves close process control is possible because the pores of the crystalline network are uniform rather than of varied dimensions, as is the case with other adsorbents. With this large surface area and pore volume, molecular sieves can make separations of molecules, utilizing pore uniformity, to differentiate on the basis of molecular size and configuration.

Molecular sieves are crystalline, metal aluminosilicates with three dimensional network structures of silica and alumina tetrahedra. This very uniform crystalline structure imparts to the Molecular Sieves properties which make them excellent desiccants, with a high capacity even at elevated temperatures. Some molecular sieves, in addition to this high adsorptive capacity, have the ability to indicate relative humidity by a change in color, which can be utilized to determine the point where reactivation is required.

The crystalline metal alumino-silicates have a three-dimensional interconnecting network structure of silica and alumina tetrahedra. The tetrahedra are formed by four oxygen atoms surrounding a silicon or aluminum atom. Each oxygen has two negative charges and each silicon has four positive charges. This structure permits a sharing arrangement, building tetrahedra uniformly in four directions. The trivalency of aluminum causes the alumina tetrahedron to be negatively charged, requiring an additional cation to balance the system. Thus, the final structure has sodium, potassium, calcium or other cations in the network. These charge balancing cations are the exchangeable ions of the zeolite structure.

In the crystalline structure, up to half of the quadrivalent silicon atoms can be replaced by trivalent aluminum atoms. Zeolites containing different ratios of silicon to aluminum ions are available, as well as different crystal structures containing various cations.

In the most common commercial zeolite, Type A, the tetrahedra are grouped to form a truncated octahedron with a silica or alumina tetrahedron at each point. This structure is known as a sodalite cage.

When sodalite cages are stacked in simple cubic forms, the result is a network of cavities approximately 11.5Å in size, accessible through openings on all six sides. These openings are surrounded by eight oxygen ions. One or more exchangeable cations also partially block the face area. In the sodium form, this ring of oxygen ions provides an opening of 4.2Å in diameter into the interior of the structure. This crystalline structure is represented chemically by the following formula:

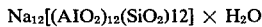

$Na_{12}[(AlO_2)_{12}(SiO_2)_{12}] \times H_2O$

The water of hydration which fills the cavities during crystallization is loosely bound and can be removed by moderate heating. The voids formerly occupied by this water can be refilled by adsorbing a variety of gases and liquids. The number of water molecules in the structure (the value of $X$) can be as great as 27.

The sodium ions which are associated with the aluminum tetrahedra, tend to block the openings, or conversely may assist the passage of slightly oversized molecules by their electrical charge. As a result, this sodium form of the molecular sieve, which is commercially called 4A, can be regarded as having uniform openings of approximately 4Å diameter.

Because of their base exchange properties, zeolites can be readily produced with other metals substituting for a portion of the sodium.

Among the synthetic zeolites, two modifications have been found particularly useful in industry. By replacing a large fraction of the sodium with potassium ions, the 3A molecular sieve is formed (with openings of about 3Å). Similarly, when calcium ions are used for exchange, the 5A (with approximately 5Å openings) is formed.

The crystal structure of the Type X zeolite is built up by arranging the basic sodalite cages in a tetrahedral stacking (diamond structure) with bridging across the six-membered oxygen atom ring. These rings provide opening 9–10Å in diameter into the interior of the structure. The overall electrical charge is balanced by positively charged cation(s), as in the Type A structure. The chemical formula that represents the unit cell of Type X molecular sieve in the soda form is shown below:

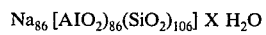

$Na_{86}[AlO_2)_{86}(SiO_2)_{106}] \times H_2O$

As in the case of the Type A crystals, water of hydration can be removed by moderate heating and the voids thus created can be refilled with other liquids or gases. The value of $X$ can be as great as 276.

A prime requisite for any adsorbent is the possession of a large surface area per unit volume. In addition, the surface must be chemically inert and available to the required adsorbate(s). From a purely theoretical point of view, the rate at which molecules may be adsorbed, other factors being equal, will depend on the rate at which they contact the surface of adsorbent particles and the speed with which they diffuse into particles after contact. One or the other of these factors may be controlling in any given situation. One way to speed the mass transfer, in either case, is to reduce the size of the adsorbent particles.

While the synthetic crystals of zeolites are relatively small, e.g., $0.1\mu$ to $10\mu$, these smaller particles may be bonded or agglomerated into larger shapes. Typical commercial spherical particles have an average bonded particle size of $100\mu$ to $500\mu$ (4 × 12 mesh). Other molecular sieve shapes, such as pellets (1–3 mm diameter), Rashig rings, saddles, etc., are useful for continuous sorption processes. The preferred molecular sieve materials are Type A, L, X and Y zeolites or mixtures of these zeolites, having an average particle size of about $1\mu$ to $10\mu$ for powder or $10\mu$ to $500\mu$ for bonded particles.

Referring to the drawing, an ozone decomposition apparatus 10 is shown partially cut away. A vertical cylindrical vessel 12 provides a reaction chamber. Off-gas to be treated is introduced to chamber 12 through fluid inlet means comprising conduit 16 and T-connection 17. Screen 18 is supported at the lower end of vessel 12 by annular ring 19. Screen 18 may be fabricated of metal or suitable material having sufficient strength to support a bed of dielectric absorbent particles 20, such as zeolite molecular sieve particles. A concentric metal electrode 24 is inserted through vessel 12 in contact with particles 20. Electrode 24 is held in fixed position by electrically insulated bushing 26 connected to T-connection 17. Electrode 24 is operatively connected to power source 40 by electrical lead 41. The power source is connected to ground by electrical lead 42.

Vessel 12 may be constructed of an electrically conducted material such as steel to provide a path for direct contact with particulate bed 20. Vessel 20 may be connected to ground by electrical lead 44. Means for draining the vessel 12 may be provided by fluid conduit 27 having valve 28 disposed therein. Conduit 14 is provided with means, such as a control valve, for interrupting inlet fluid flow during regeneration, if desired. Discharge outlet 16 can be vented to atmosphere during regeneration to remove sorbate vapor along with the decomposed ozone gas stream.

The reactor configuration may be adapted to different process requirements. High gas throughput is obtainable for many processes. Condensation of water vapor or desorbed liquid may require a gravity liquid flow through the particulate bed to a drainport, as shown in the drawing. In other systems, the electrodesorbed component is removed only in the vapor phase. It is feasible to operate the molecular sieve bed under continuous electrodesorbing conditions, whereby water is effectively adsorbed and desorbed in a single pass.

The vessel 12 may be constructed of electrically insulating material such as polyvinyl chloride (PVC), nylon phenolic, acrylic, or ABS resin, glass, glass-lined steel, or wound fiberglass/resin. Where a case electrode is employed, the shell may be metal or metal-lined.

Electrodes may be constructed of sintered metal powder, steel wool, drilled carbon or other foraminous electrically conducting materials. Powdered sieve may be contained by porous metal screen/wool electrode-structures.

The physical state of the bed while treating ozone need not be the same as during the electrodesorption step. The degree of compaction can vary widely within the operable limits of the system. During regeneration, the zeolite particles should be maintained in a physical state to permit electrical flow from a first electrode to a second electrode through an electrical path from particle to particle. Ordinarily, a void volume of less than 50 vol.% is suitable to achieve this condition. Loosely-packed fluid-permeable molecular sieve beds have a macro-porosity or void volume of about 30–40 vol.%. It is believed that the flow of electrical current takes place on the particle surface due to mobility of the alkali metal ion in the sorbed water phase.

Measurements of electrical flow during regeneration indicate an efficient use of energy. Experience has shown that absorption of water onto a molecular sieve material evolves thermal energy equivalent to the heat of vaporization, which for water is 54 calories per gram (cal./g). Electrodesorption according to the present invention consumes about 106 cal./g equivalent energy, based on 1 part water per 100 parts by weight molecular sieve material (1% $H_2O$). By comparison, prior art methods for regeneration by heating require sufficient energy to heat the bed as well as vaporize the water. Assuming a conventional thermal coefficient of 0.2 cal./° C and a conservative minimum bed temperature of 100° C for thermal regeneration, about 277 cal./g would be required. In actual industrial practice, regeneration temperatures of about 200° C to over 300° C are employed, greatly increasing the energy requirements. Another valuable comparison for water removal is the electrochemical energy. The theoretical minimum for electrolyzing water to form $H_2$ and $O_2$ is 1230 cal./g. Thus, the novel system can be operated with lower energy requirements than any known regeneration process.

While the mechanism of electrodesorption of wet zeolites is not completely understood, it is believed that the water is first desorbed as a liquid and vaporized from a thin electrolyte film by energy dissipated in the film as heat during application of high voltage. As water is removed from the particles by desorption and evaporation, the bulk resistivity increases. When operating under intermittant conditions, at a predetermined moisture content (as measured by gas dewpoint, bed conductivity, power consumption or other means), the regeneration step is terminated and the decomposition cycle is continued.

The power requirements for electrodesorption are sufficiently like those requirements for the ozone generator to permit a common power supply or common power components.

The electrodesorption power requirements for periodic regeneration are rather low. A typical saturated molecular sieve material is regenerated in about 30–60 seconds at 4000 VDC/cm. It is known to remove water from molecular sieves in a high frequency field, as in U.S. Pat. No. 3,359,707; however, a relatively low frequency electrical power supply of 0 to $10^3$Hz is preferred.

The electrical parameters can be controlled to obtain optimum utilization of the sieve bed during regeneration. Readily available zeolite particles can withstand in excess of 10 Kv/cm electrical potential. Where the heating rate is high, most of the electrical energy is converted to vaporize water during separation. The amount of electrical energy consumed in regenerating the bed can be slightly greater than the caloric equivalent to the heat of vaporization of water removed from the bed.

To facilitate a uniform rate removal of water, the regeneration step may be carried out under controlled conditions, such as constant current. As sorbed water is removed from the bed, electrical conductivity decreases, which requires an increase in voltage to maintain the desired current. The current density is preferably maintained at a value of about 0.01 to 100$\mu$a/cm$^2$ (microamperes per square centimeter), with optimum performance for most zeolites being obtained under constant current conditions in the range of 1 to 10$\mu$a/cm$^2$. Currents as low as 0.001$\mu$a/cm$^2$ or as high as 1 a/cm$^2$ are feasible. The above current density values are based on uniformly-sized electrodes. It is understood that different maxium and minimum values may be applied to electrically different areas.

For reactivating moisture-loaded metal alumino silicates, the voltage gradient preferably is about 0.2 to 10 Kv/cm, with best results being obtained in the 0.5 to 2 Kv/cm range. However, it is possible to use voltages up to the electrical breakdown of the strongest dielectric zeolite (up to 500 Kv/cm).

The bulk resistivity ($\rho$) of zeolite particles is measured in a packed bed having the particles in contact with one another and completely filling the interelectrode space between uniformly shaped parallel conductors. The measured resistance (R) is expressed as $R = (\rho l/A)$, where $\rho$ is the bulk resistivity (ohms-cm$^2$/cm), l is the interelectrode distance (cm) and $A$ is the cell cross-sectional area (cm$^2$).

Current density is a function of bulk resistivity, applied voltage and interelectrode distance, according to the equation:

$I/A = 1/\rho \ (E/1)$. As moisture content of a sieve bed increases, the conductivity increases ($\rho$ decreases) and more current flows for a given field strength (E/1). In order to maintain constant current during water removal, the electrical field is increased proportionally to conductivity. Thus, when batch reactivation is started, a relatively low voltage gradient is applied and increasing voltage is applied as the water is driven off. The final voltage may be as high as ten times the initial value ($E_f \cong 10 \times E_o$).

The power supply may provide a continuous DC potential, pulsed DC, a square wave or sinusoidal wave of alternating current. Relatively low frequencies of 0 to 60 Hz are preferred; however, the skin conductance phenomenon is efficacious at higher frequencies, for instance 400 Hz or as high as 10$^3$Hz. Radio frequencies, such as produced by a HV generator (about 10$^7$Hz), cause overheating of the dielectric sieve adsorbent and are not as efficient in energy consumption as the preferred lower frequencies. DC and very low frequency (0–60 Hz) power supplies are preferred because of the large power factors achieved, as compared to HF generators or other relatively high frequency sources. By employing such electrical supplies, the heating may be confined largely to electrolytic film or surface layer of the absorbent crystallite structure without heating the body of the absorbent itself.

While the invention has been shown by specific examples, there is no intent to limit the inventive concept except as set forth in the following claims.

What is claimed is:

1. A method for decomposing ozone which comprises:
    (a) contacting a gas mixture which includes ozone and water vapor with a bed of crystalline aluminosilicate zeolite, said zeolite being active for the decomposition of ozone; and
    (b) maintaining the activity of said zeolite bed by the application of a 0–10$^3$ Hz electrical field of at least 0.2 Kv/cm across the bed to maintain a current density of about 0.01 to 100 microamps/cm$^2$ to remove water from said bed as molecular water.

2. The method of claim 1 wherein said zeolite is selected from the group consisting of Type A, L, X and Y zeolites.

3. The method of claim 1 wherein the particle size of said zeolite is in the range of from about 1 micron to 500 microns.

4. The method of claim 1 wherein the activity of said bed is maintained continuously during the decomposition process.

5. The method of claim 1 wherein said activity is maintained by periodically applying said electrical field and conducting a gas through said bed to remove water from said bed.

6. The method of claim 1 wherein the temperature of said bed is maintained above −50° C.

7. The method of claim 1 wherein said gas mixture is off-gas from a water treatment process.

8. In an improved method for decomposing ozone mixed with a moisture containing gas stream wherein the stream is contacted with a crystalline aluminosilicate zeolite which is active for the decomposition of ozone, the improvement comprising maintaining the ozone decomposition activity of the zeolite by the application of a 0–10$^3$ Hz electrical field of at least 0.2 Kv/cm across the zeolite to maintain a current density of about 0.01 to 100 microamps/cm$^2$, whereby water is removed from said zeolite substantially as molecular water.

9. The method of claim 8 wherein said electrical field is continuously applied to said zeolite.

10. The method of claim 8 wherein said zeolite is a particulate zeolite bed selected from the group consisting of Type A, L, X and Y zeolites.

11. The method of claim 8 wherein said electrical field is applied periodically to said zeolite.

12. The method of claim 8 wherein said stream is off-gas from a water treatment process.

* * * * *